United States Patent [19]

Maire

[11] 4,300,223

[45] Nov. 10, 1981

[54] SYSTEM FOR MAKING-UP STEPS LOST BY THE MOTOR OF A TIME-PIECE

[75] Inventor: Bernard Maire, Marin, Switzerland

[73] Assignee: Ebauches Electroniques SA, Marin, Switzerland

[21] Appl. No.: 968,918

[22] Filed: Dec. 13, 1978

[30] Foreign Application Priority Data

Dec. 20, 1977 [CH] Switzerland ...................... 15655/77

[51] Int. Cl.[3] ...................... G04C 19/00; G04C 3/00; G04C 5/00; G05B 19/40

[52] U.S. Cl. ...................................... 368/85; 368/217; 318/696

[58] Field of Search .................. 58/23 R, 23 D, 28 R, 58/28 D; 318/696, 685, 129, 130, 138; 368/159, 217-219, 85-87

[56] References Cited

U.S. PATENT DOCUMENTS

| | | | |
|---|---|---|---|
| 3,553,957 | 1/1971 | Dome et al. | 58/23 |
| 3,750,000 | 7/1973 | Bruckner et al. | 318/696 |
| 4,032,827 | 6/1977 | Dobratz et al. | 318/696 |
| 4,074,179 | 2/1978 | Kuo et al. | 318/696 |
| 4,212,156 | 7/1980 | Kawamura et al. | 368/85 |

FOREIGN PATENT DOCUMENTS

| | | | |
|---|---|---|---|
| 2817656 | 10/1978 | Fed. Rep. of Germany | 58/23 D |
| 2200675 | 4/1974 | France . | |
| 2210768 | 7/1974 | France . | |
| 2220919 | 10/1974 | France . | |

*Primary Examiner*—J. V. Truhe

*Assistant Examiner*—John B. Conklin

*Attorney, Agent, or Firm*—Wender, Murase & White

[57] ABSTRACT

The present invention concerns a time-piece comprising a system for detecting the non-rotation of a stepping motor and for making-up lost steps.

The detection system comprises a device for measuring the current delivered to the motor, the logic level of the measured signal being used for controlling a correction circuit delivering additional pulses to the stepping motor. The measuring device comprises a short duration measuring pulse generator, a reference signal source, and a comparator having an output which controls the correction circuit.

8 Claims, 10 Drawing Figures

SYSTEM FOR MAKING-UP STEPS LOST BY THE MOTOR OF A TIME-PIECE

BACKGROUND OF THE INVENTION

The present invention relates to a system for making-up steps lost by the stepping motor of a timepiece, comprising an oscillator used as a time base, a frequency-divider chain coupled to the oscillator, a shaping circuit for the pulses delivered by the divider chain, and a circuit for providing current driving pulses to the stepping motor under the control of the shaping circuit.

The principle of the invention is general, but it will be explained hereafter in the particular case where the stepping motor is of the Lavet type. As shown in FIG. 1, such a motor comprises a cylindrical permanent magnet 1', forming the rotor, inserted in a magnetic circuit 2' on which there is wound an excitation coil 3'. This motor requires bipolar control pulses as it is necessary to reverse the polarity of the magnetic circuit at each half turn of the rotor 1'.

Now, when such a motor misses a step, the following control pulse arrives with the rotor 1' already in its stable electromagnetic position, so that it will not turn. Thus, the motor will have lost two steps. This fault can become serious on watches where the time between two driving pulses is relatively large, for example, on watches which only comprise hour and minute hands.

To understand the principle on which the invention relies, let us first of all examine how the current used by the motor behaves in the following different cases.

FIG. 2 shows an oscillogram of the current consumed by a motor turning normally. At time $t=0$, a pulse of duration $T_D$ is applied to the excitation coil 3'. During the period a, the rotor 1' starts to turn and the current increases approximately exponentially. During the period b, the rotor 1' turns and creates a counterelectromotive force (e.m.f) which tends to reduce the current. During period c, the rotor 1' has reached its new position, the counterelectromotive force ceases, and the current increases up to the end of the driving pulse.

FIG. 3 illustrates an oscillogram of the current used by a motor in which rotor 1' is locked. In this case, the magnetomotive force (m.m.f) of the permanent magnet of the rotor 1' subtracts from the m.m.f. of the coil 3', and the iron, or core of the magnetic circuit 2' is not saturated. The rise of current is exponential, of the form EXP-(R.t/L), where the time constant L/R is relatively large with respect to the length of the driving pulse. FIG. 4 shows that the polarity of the magnet is opposed to that of the coil 3'. FIG. 5 shows that the ampere-turns of the magnet do not affect those of the coil 3', so that the inductance B is not very high.

FIG. 6 shows the oscillogram of the current of a motor, the rotor 1' of which is already in position at the time of the arrival of the driving pulse. It is to be noted that the current increases rapidly due to the fact that the equivalent inductance of the circuit is small. This is explained by the saturation of the magnetic circuit. FIG. 7 shows that the magnetic polarity of the rotor 1' is in the same direction as that of the core 2' and FIG. 8 shows that the ampere-turns of the magnet add to those of the coil 3', so that the inductance B is high, which produces saturation of the core.

Comparing the three cases discussed above and the oscillograms of current shown respectively in FIGS. 2, 3 and 6, it is to be noted that in the case of FIG. 6, the current measured, for example, two milliseconds after the start of the driving pulse has a value approximately two times larger than in the two other cases forming the subject of FIGS. 2 and 3. Consequently, a measurement effected approximately two milliseconds after the start of the driving pulse permits non-rotation of the motor to be detected. The duration of the measurement must be very short for the current consumption of the measurement circuit to be negligible.

The object of the present invention is to provide a system which detects the non-rotation of the stepping motor and delivers information to the logic driver permitting making-up of the lost steps.

SUMMARY OF THE PRESENT INVENTION

According to the present invention there is provided a system for making-up steps lost by a stepping motor of a time-piece, comprising an oscillator as a time base, a frequency divider chain coupled to the oscillator, a shaping circuit for the pulses delivered by the divider chain, a circuit for providing current driving pulses to the stepping motor under the control of the shaping circuit, means for measuring the current supplied to the motor, means for comparing the current measured with a reference value for producing a pulse signalling the non-rotation of the motor when the current exceeds the reference value, and means for correction in response to the pulse for providing at least one additional pulse to the motor.

The invention will be described further, by way of example, with reference to the accompanying drawings, of which FIGS. 1 to 8 have already been discussed above.

DESCRIPTION OF THE PREFERRED EMBODIMENT

Figure 9:
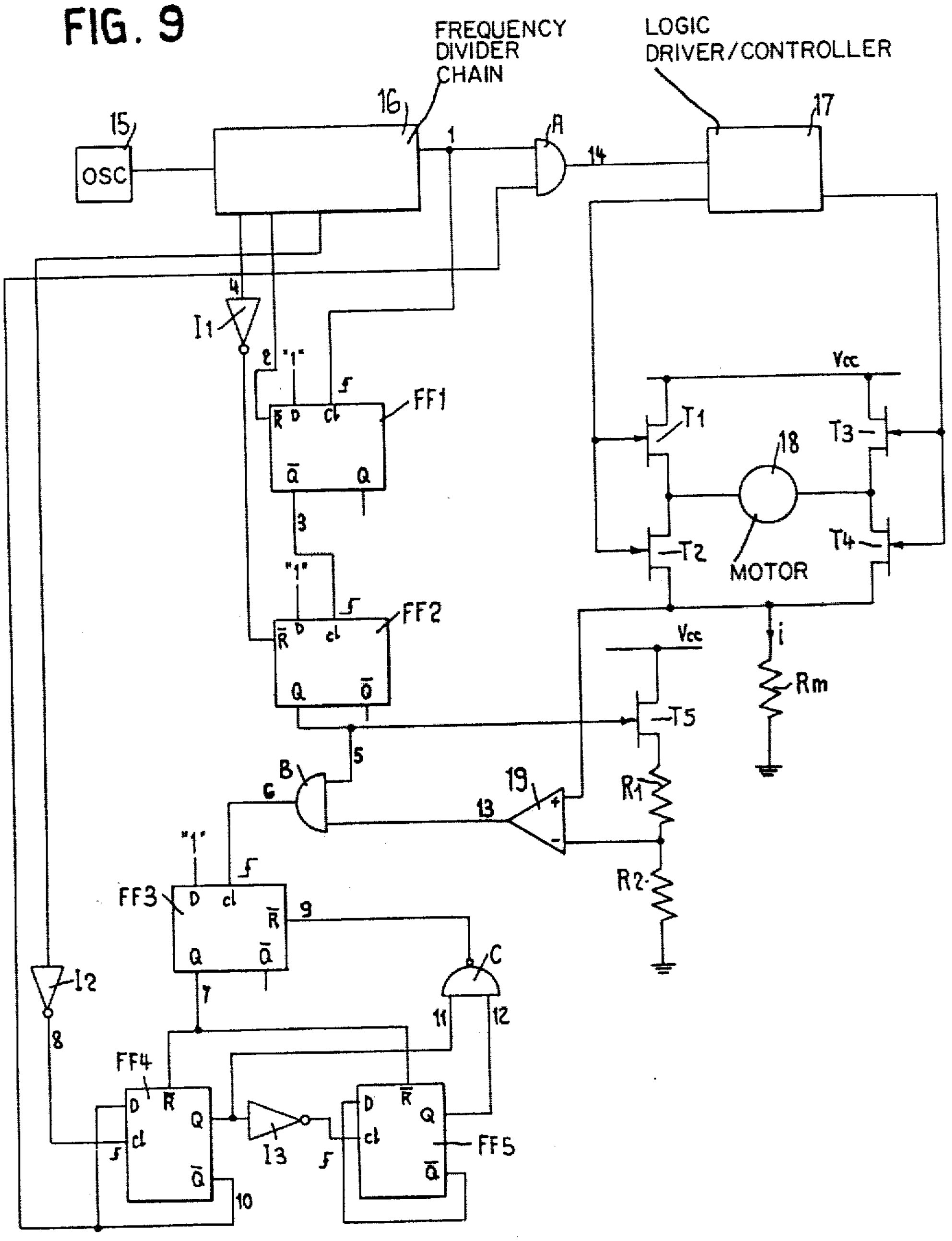
FIG. 9 is a circuit diagram of a system for detecting and making up steps lost by the motor of a timepiece in accordance with the invention.

The circuit of FIG. 9 comprises an oscillator 15 connected to a frequency divider chain 16, a first output 1 of which is connected to a first input of an AND gate A, the output 14 of which is connected to an input of a logic driver/controller 17. The two outputs of the logic controller 17 respectively control the transistors T1, T2 and T3, T4 connected as a bridge and feeding the stepping motor 18. The bridge is connected to earth by a measuring resistance Rm. A second output 2 of the frequency divider chain 16 is connected to the reset terminal $\bar{R}$ of a D-type flip-flop FF1, the D input of which is connected at logic level 1, and the clock input Cl is connected to the output 1 of the divider 16. The output 3 of FF1 is connected to the clock input Cl of a D-type flip-flop FF2, the D input of which is at level 1. The reset input $\bar{R}$ is connected to the output of an inverter I1, the input of which is connected to a third output 4 of the divider chain 16. The output 5 of FF2 is connected, on the one hand, to a first input of an AND gate B, and, on the other hand, to the gate of a transistor T5 connected in series with two resistors R1 and R2 between the pole of the supply and ground. The resistors R1 and R2 are also mounted in series, and resistor R2 is adjustable. The second input of the AND gate B is connected to the output 13 of a comparator 19, the direct input of which is connected to a point common to transistors T2 and T4 and the measuring resistance Rm. The inverted input of comparator 19 is connected to a common point of resistors R1 and R2. The output 6 of the gate B is connected to the clock input Cl of a D-type flip-flop FF3, the D input of which is a logic level 1 and, the reset input $\bar{R}$ of which is connected to the output 9 of a NAND gate C. The output 7 of the FF3 is connected to the reset inputs $\bar{R}$ of two D-type flip-flops FF4 and FF5. The D inputs of FF4 and FF5 are respectively connected to the $\bar{Q}$ output of FF4 and $\bar{Q}$ of FF5. The clock input Cl of FF4 receives the output signal 8 of an inverter I2, the input of which is connected to a fourth output of the divider chain 16. The Q output of FF4 is connected, on the one hand, through an inverter I3 to the clock input Cl of FF5 and, on the other hand, to a first input 11 of the gate C. The Q output of FF5 is connected to the second input 12 of the gate C. Finally, the output 10 ($\bar{Q}$) of FF4 is connected to the second input of the gate A.

Figure 10:
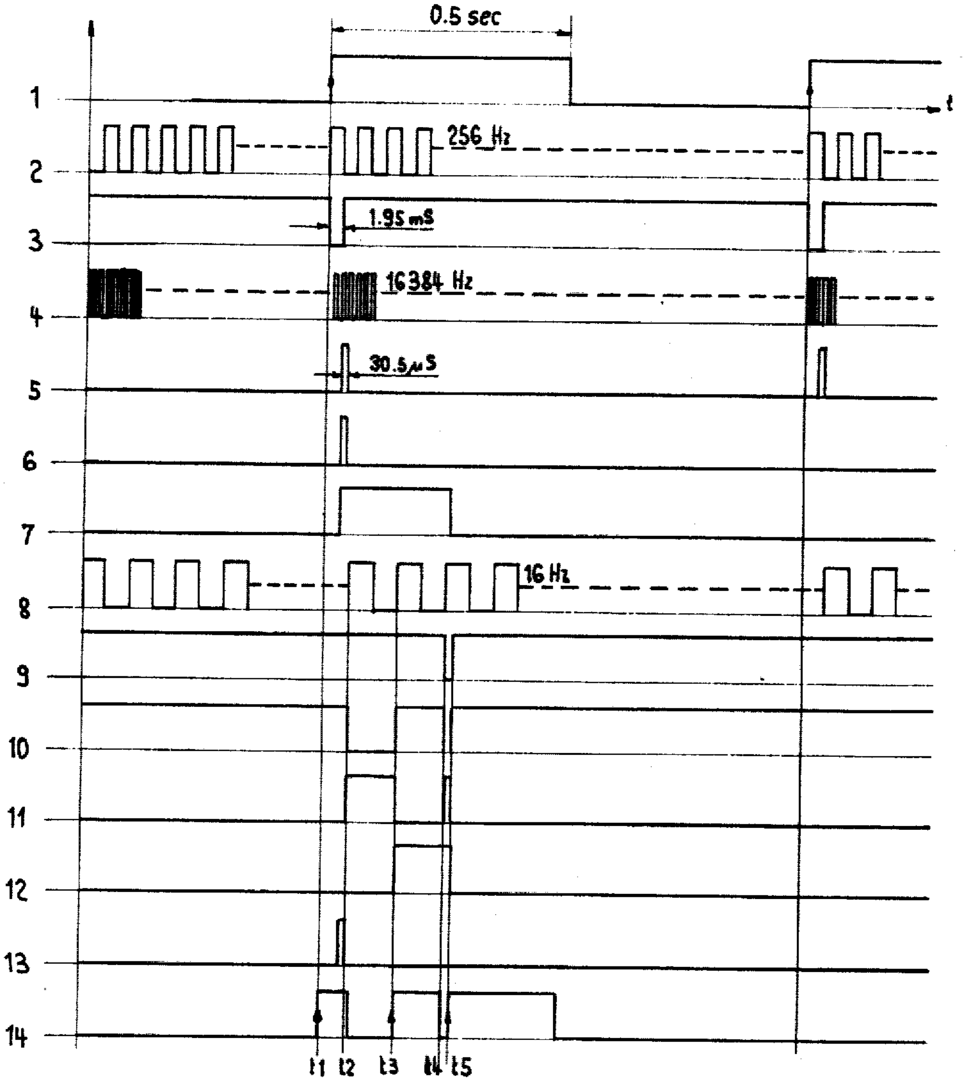
FIG. 10 is an impulse diagram of the signals of the system in accordance with FIG. 9.

The functioning of the circuit of FIG. 9 is now explained with the aid of the pulse diagram of FIG. 10. In this diagram, the signals are designated by the same numerals (1 to 14) as are used in FIG. 9 for indicating the place in the circuit where they are to be found.

Figure 1:
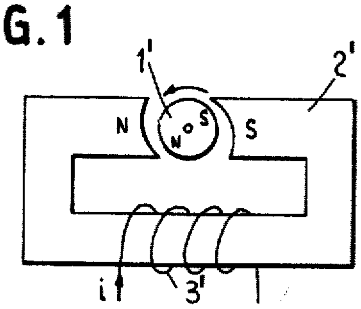
FIG. 1 is a diagram of a stepping motor of the Lavet type.
Figure 2:
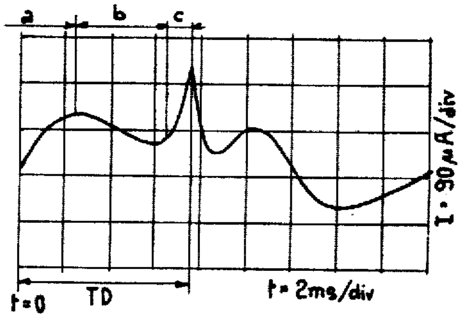
FIG. 2 is an oscillogram of the current in a motor of the Lavet type turning normally.
Figure 3:
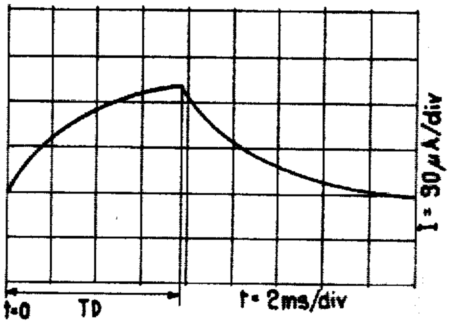
FIG. 3 is an oscillogram of the current in a motor of the Lavet type in which the rotor is locked.
Figure 4:
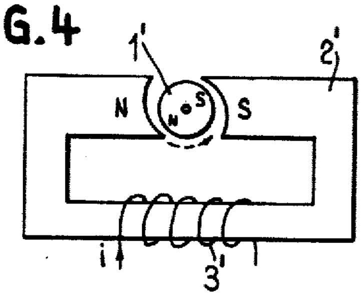
FIG. 4 is a diagram of a stepping motor of the Lavet type showing the relations of the polarity between the rotor and the magnetic circuit of the motor, in the case in which the rotor is locked.
Figure 5:
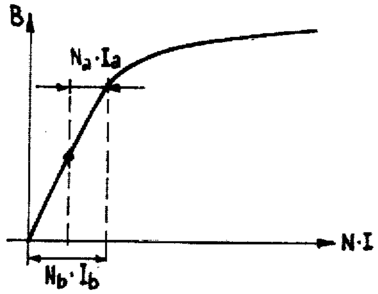
FIG. 5 is a diagram of the induction in the magnetic circuit of a motor of the Lavet type in which the rotor is locked, as a function of the ampere-turns in the excitation coil.
Figure 6:
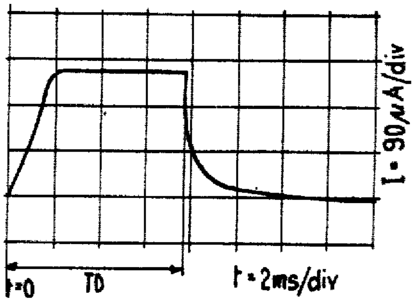
FIG. 6 is an oscillogram of the current in a motor of the Lavet type in which the rotor is already in position.
Figure 7:
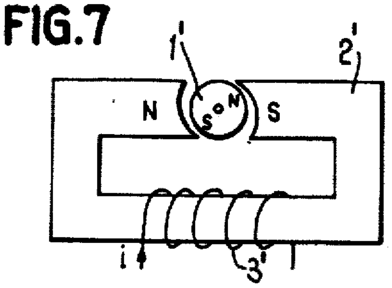
FIG. 7 is a diagram of a motor of the Lavet type showing the relations of the polarity between the rotor and the magnetic circuit of the motor, in the case in which the rotor is already in position.
Figure 8:
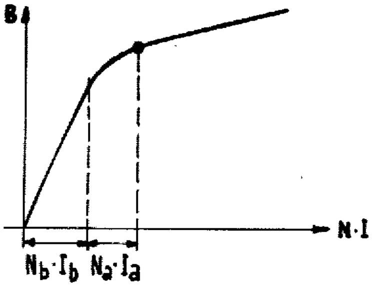
FIG. 8 is a diagram of the induction in the magnetic circuit of a motor of the Lavet type in which the rotor is already in position, as a function of the ampere-turns in the excitation coil.

Each positive-going edge of the signal at 1, with a repetition frequency of 1 Hz for example, changes over the output 3 ($\bar{Q}$) of FF1 which goes from 1 to 0. The reset input $\bar{R}$ of this same flip-flop receives a signal of 256 Hz, for example, delivered by the output 2 of the divider chain 16. Each time this signal switches over from 1 to 0, FF1 is returned to zero, so that the output 3 returns to its initial state 1, which occurs 1.95 mS ($\frac{1}{2}$ period of the signal of 256 Hz) after its change over. The signal 3 is thus a pulse against 0 of a duration of 1.95 mS. When the output 3 switches over from 0 to 1, it changes over the FF2, the output 5 (Q) of which switches over from 0 to 1. The reset input $\bar{R}$ of FF2 receives a signal of 16384 Hz, for example, through the inverter I1, delivered by the third output 4 of the divider chain 16. As a result when the output 4 changes over from 0 to 1, FF2 is returned to zero, its initial state, which occurs 30.5 $\mu$S ($\frac{1}{2}$ period of the 16384 Hz signal) after its change over. There is thus obtained at 5 a pulse of 30.5 $\mu$S duration which controls the gate B and the opening of the transistor T5. Consequently, the duration of 30.5 $\mu$S of the pulse at 5 defines the duration of the current measurement. During this period, T5 is conducting and the inverted input of the comparator 19 is brought to a reference level determined by the resistances R1 and R2. Simultaneously, the voltage drop of the current i of the motor in the measuring resistance Rm is applied at the direct input of the comparator 19. If the voltage at the terminals of Rm is larger than that at the terminals of R2, the output 13 of the comparator 19 will go to level 1. This case corresponds to that of FIG. 6 where the rotor is already in position at the arrival of the driving pulse, i.e. at a non-rotation of the motor. In all the other cases, the output 13 of the comparator 19 is at level 0. When the output 13 is at level 1, a clock pulse is produced at the output 6 of the gate B which will change over FF3, the output 7 (Q) of which switches over from 0 to 1 and frees the reset inputs $\bar{R}$ of FF4 and FF5. The flip-flop FF4 receives a clock pulse 8, delivered through the inverter I2, by a fourth output of the divider chain 16, at a frequency of 16 Hz, for example. The combination of FF4 and FF5 is a binary counter which starts to count at the frequency of 16 Hz upon the arrival of the first clock pulse 8, appearing after the freeing of the inputs $\bar{R}$ of FF4 and of FF5. At the moment t4, where the outputs 11 and 12 are simultaneously at 1, the output 9 of the gate C switches over to 0, which has the effect of returning the flip-flop FF3 to zero, the output 7 of which switches over to 0, which also returns the counter FF4, FF5 to zero, the output 10 of which changes over to 1 at the instant t5. The time interval t5-t4 is due to the propagation time of the signal between the output of the gate C and the switching over of the output 10 of FF4 from 0 to 1. The output 10 subsequently remains permanently at level 1, which opens the gate A, so that the output 14 of this no longer depends on the signal 1 of the output of the divider chain 16. Upon the arrival of the measuring pulse at 5, the rotor of the motor is already in position, so that the pulse arriving at 14 at the instant t1 will not drive the rotor. As a result, the level of the output 13 of the comparator 19 is at 1, which produces through flip-flop FF3, the start of a counting sequence of the flip-flops FF4 and FF5. From the instant t1, the output 1 of the divider chain 16 being at the level 1 for a duration of 0.5 seconds, the logic state during this interval of time at the output 14 of the gate A only depends on the logic state at the output 10 of FF4. At t3, the output 10 switches over from 0 to 1, and similarly at t5; it will thus be the same as the output 14. The motor 18 thus receives two correcting pulses, at a frequency of 16 Hz, one at time t3 and the other at time t5, each time the motor misses a step. Consequently, the two lost steps are caught up and the time-piece is no longer retarded.

Of course the circuit of FIG. 9, such as is described hereabove, only constitutes one possible embodiment of a circuit for the detection of the non-rotation of the stepping motor and the catching up of the lost steps. In particular, the frequency of catching up can be different from 16 Hz, the duration of the measuring pulse can be different from 30.5 $\mu$S and, the measurement can be made at a time interval different from 2 mS from the beginning of the driving pulse. On the other hand, it is clear that the comparator can be of a different conception to that of FIG. 9. It can be based on a reference which is, for example, a source of current which is a function of the supply voltage so that the reference current follows possible fluctuations of this voltage. Moreover, it is also possible to reinforce the ampere-turns of the catching up pulses or even to elongate the duration of these pulses.

We claim:

1. A system for making-up steps lost by a stepping motor of a timepiece, comprising:

means for providing a time base;

frequency divider means coupled to said time base means;

means connected to said frequency divider means for providing driving pulses to the stepping motor;

means coupled to said driving pulses means and to said frequency divider means for measuring the value of the current in the motor at a predetermined time after the leading edge of each of said driving pulses;

comparator means coupled to said current measuring means for comparing said measured value of said current in the motor with a predetermined value of reference, said comparator means producing a pulse signalling the non-rotation of the motor when said measured value of said current exceeds said value of reference; and correcting means coupled to said comparator means and to said driving pulses means for delivering in response to said signalling pulse at least one additional correcting pulse to said motor through said driving pulses means.

2. A system in accordance with claim 1, including means for producing, during each driving pulse, a control pulse for said means for comparing.

3. A system in accordance with claim 2, wherein said reference value corresponds to a level attained by the current measured when the preceding driving pulse has not caused the rotation of the motor.

4. A system in accordance with claim 3, wherein said correcting means comprises:

a flip-flop controlled by said signalling pulse produced upon the non-rotation of the motor; and a counter enabled by the output signal of said flip-flop for counting the pulses furnished by an output of said divider means for delivering two additional pulses to the motor.

5. A system in accordance with claim 4, wherein the frequency of said additional pulses is higher than that of the pulses provided by said divider means to said driving pulses means.

6. A system in accordance with claim 2, wherein said means for comparing comprises:

a reference signal source;

a comparator connected to said source and to said measuring means; and a switch responsive to said control pulse for applying said reference signal to said comparator.

7. A system in accordance with claim 6, wherein said reference signal source is a current source which is a function of the supply voltage, said comparator being a current comparator.

8. A system of detection in accordance with claim 6, wherein said reference signal source is a voltage source which is a function of the supply current, said comparator being a voltage comparator.

* * * * *